United States Patent [19]
Roberts

[11] 3,977,367
[45] Aug. 31, 1976

[54] DUAL FUEL INJECTION NOZZLE

[75] Inventor: Thomas C. Roberts, Ridgewood, N.J.

[73] Assignee: Curtiss-Wright Corporation, Wood-Ridge, N.J.

[22] Filed: Oct. 21, 1974

[21] Appl. No.: 516,758

[52] U.S. Cl. .............................. 123/8.09; 123/32 F
[51] Int. Cl.[2] ..................... F02B 53/10; F02B 53/12
[58] Field of Search................. 123/8.09, 8.11, 8.13, 123/30 B, 32 F, 32 JV; 239/418, 533, 549

[56] References Cited
UNITED STATES PATENTS

| | | | |
|---|---|---|---|
| 1,206,359 | 11/1916 | Ohlsson | 123/32.6 |
| 3,174,466 | 3/1965 | Scherenberg | 123/8.11 |
| 3,421,702 | 1/1969 | O'Brien | 239/549 X |
| 3,612,012 | 10/1971 | Dreisin | 123/32 JV |
| 3,698,364 | 10/1972 | Jones | 123/8.09 |
| 3,795,227 | 3/1974 | Jones | 123/8.09 |

FOREIGN PATENTS OR APPLICATIONS

| | | | |
|---|---|---|---|
| 441,788 | 8/1912 | France | 123/30.1 |
| 1,914,742 | 10/1970 | Germany | 123/32 G |
| 37,324 | 7/1923 | Norway | 123/32.6 |

Primary Examiner—C. J. Husar
Assistant Examiner—Leonard Smith
Attorney, Agent, or Firm—Victor D. Behn; Arthur Frederick

[57] ABSTRACT

A rotary combustion engine designed for operation as a stratified charge engine with two separately controllable fuel injection means combined into a single unitary fuel injection nozzle structure.

1 Claim, 3 Drawing Figures

DUAL FUEL INJECTION NOZZLE

BACKGROUND OF THE INVENTION

The invention generally relates to a rotary combustion engine of the type disclosed in prior U.S. Pat. No. 2,988,065 and is more particularly directed to such an engine designed for operation as a stratified charge engine having two separate fuel injection nozzles for discharging fuel into the engine working chambers. Prior stratified charge rotary combustion engines having dual fuel injection nozzles are described in U.S. Pat. No. 3,698,364 and in co-pending patent application, Ser. No. 424,056 filed Dec. 12, 1973, now U.S. Pat. No. 3,894,518 granted to Gavrun et al. on July 15, 1975.

Such rotary combustion engines include a housing or outer body having a trochoidal inner surface and a rotor mounted within the housing and having apex seal portions for sealing cooperation with said trochoidal surface. In the case of prior rotary engines having dual fuel nozzles, the nozzles are separately mounted in the engine housing for discharge through individual recesses in the trochoidal surface into the engine working chambers. Each such trochoidal surface recess is a source of leakage of the engine working fluid from one working chamber to an adjacent chamber across the rotor apex seals as the apex seals move across a fuel nozzle recess. Any such leakage obviously represents a loss in engine efficiency and therefore increases the engine fuel consumption. In addition, the provision of two separately mounted fuel nozzles in the engine housing makes it more difficult to provide adequate and uniform cooling of the engine housing in the vicinity of the nozzles as compared to an engine housing having only one fuel nozzle.

SUMMARY

An object of the invention is to provide a rotary combustion engine having a novel dual fuel nozzle injection system in which the two fuel injection units are combined into a single unitary fuel nozzle structure so as to minimize the aforementioned difficulties of leakage of the engine working fluid and of housing cooling.

In accordance with the invention, two fuel injection nozzles are combined into a single fuel injection structure having two separate fuel passages each with its own discharge hole or holes in a nozzle tip portion. Preferably the individual nozzle discharge holes are provided in a common fuel nozzle tip portion.

Since the novel dual fuel nozzle structure does not require the provision of two separate fuel injection nozzles, the increased leakage of engine working fluid which results from the use of two separate fuel nozzles and the difficulty of adequately cooling an engine housing having two fuel injection nozzles is minimized.

Other objects of the invention will become apparent upon reading the following detailed description in connection with the drawings.

DESCRIPTION OF PREFERRED EMBODIMENTS

Figure 1:
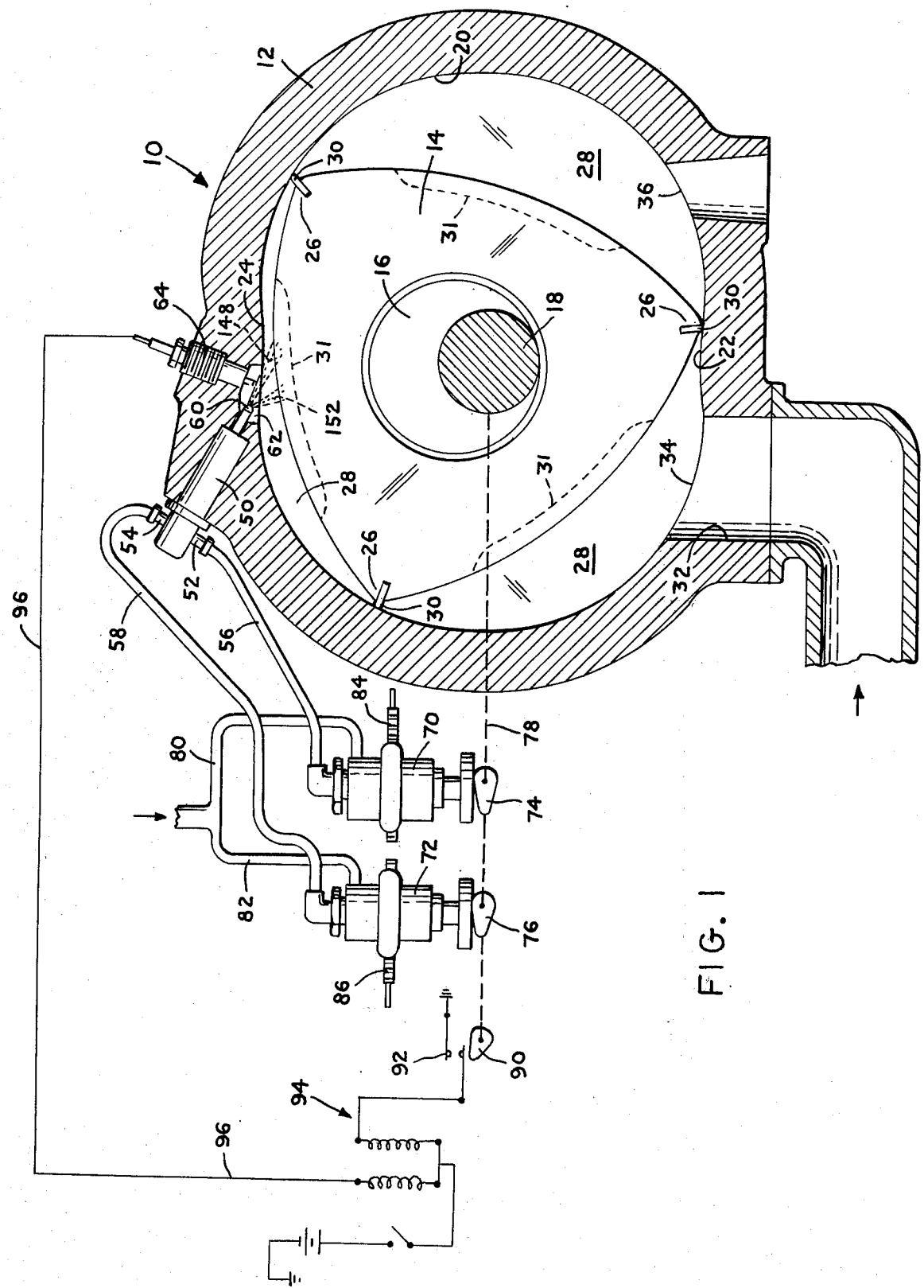
FIG. 1 is a schematic view of a rotary combustion engine with a dual fuel nozzle structure and ignition system embodying the invention.

Referring to FIG. 1 of the drawing, a rotating combustion engine is schematically indicated at 10, the engine being generally similar to the type disclosed in said aforementioned prior patents. As is more fully disclosed in said prior patents, the engine 10 comprises an outer body or housing consisting of two axially spaced end housings (not shown) and an intermediate or rotor housing 12, the housings being secured together to form an engine cavity therebetween. An inner body or rotor 14 is journaled for rotation within said engine cavity on an eccentric portion 16 of a shaft 18 which extends coaxially through the housing.

The peripheral inner surface 20 of the intermediate housing 12 is illustrated as having a two-lobe profile which preferably is basically an epitrochoid, said two lobes joining at junctions 22 and 24. The rotor 14 has a generally triangular profile with apex portions 26 having sealing cooperation with the trochoidal surface 20 to form three engine working chambers 28 between the rotor and the housing. For this purpose, each of the rotor apex portions is provided with a seal 30 which extends across the rotor between the inner walls of the end housings and the rotor also has suitable seals (not shown) provided on the side faces of the rotor. Each of the three peripheral surfaces of the rotor preferably is provided with a trough-like recess 31.

The engine 10 also includes suitable gearing (not illustrated) between the rotor 14 and the engine housing to control the relative rotation of the rotor; such gearing is conventional and preferably is similar to that illustrated in the aforementioned prior patents.

An air intake passage 32 supplies air to an air intake port 34 disposed adjacent to and at one side of the junction 22 of the two lobes of the trochoidal peripheral surface 20. The said intake passage 22 extends through the intermediate housing 12 and the port 34 opens through the inner trochoidal surface 20 of intermediate housing 12 and preferably is characterized by the absence of any air throttle valve. As is common in such rotary engines, the intake passage 32 could open into the engine cavity through a side wall of the engine housing instead of as illustrated through the intermediate housing 12. An exhaust port 36 is formed in the intermediate housing 12 adjacent to and on the opposite side of said lobe junction 22. The engine combustion is initiated in the engine working chambers 28 in the vicinity of the other junction 24 of the two lobes of trochoidal surface 20.

The structure so far described is generally similar to that disclosed in the aforementioned co-pending application, Ser. No. 424,056.

A fuel nozzle structure 50 is mounted on the intermediate engine housing 12 adjacent to the lobe junction 24. This fuel nozzle structure has two fuel inlet connections 52 and 54 for supplying fuel to the nozzle from fuel supply lines 56 and 58 respectively. In addition, the fuel nozzle structure has a single nozzle tip portion or element 60 for discharging fuel therefrom through a recess 62 in the trochoidal surface 20 of the engine housing. A spark plug 64 is provided for igniting the fuel discharging from the tip portion 60 of the nozzle structure 50.

Fuel is supplied to the two fuel supply lines 56 and 58 by two positive displacement piston-type fuel pumps 70 and 72 actuated by cams 74 and 76 respectively, said cams being driven from the engine shaft 18 by means schematically indicated at 78. Fuel is supplied to the two fuel pumps 70 and 72 by fuel lines 80 and 82 respectively. Each fuel pump 70 and 72 is provided with adjusting means such as racks 84 and 86 respectively for adjusting the effective strokes of said pumps.

A third cam 90 is also driven from the engine shaft and is arranged to operate a make-and-break switch 92 of an ignition circuit 94. The ignition circuit illustrated is conventional and is connected by a wire 96 to a spark plug 64 for energizing the spark plug in properly timed sequence.

The details of the ignition circuit and fuel pumps 70 and 72 are conventional and form no part of the present invention. Reference is made to the aforementioned co-pending application, Ser. No. 424,056 for a description of a suitable ignition circuit and fuel pumps.

Figure 2:
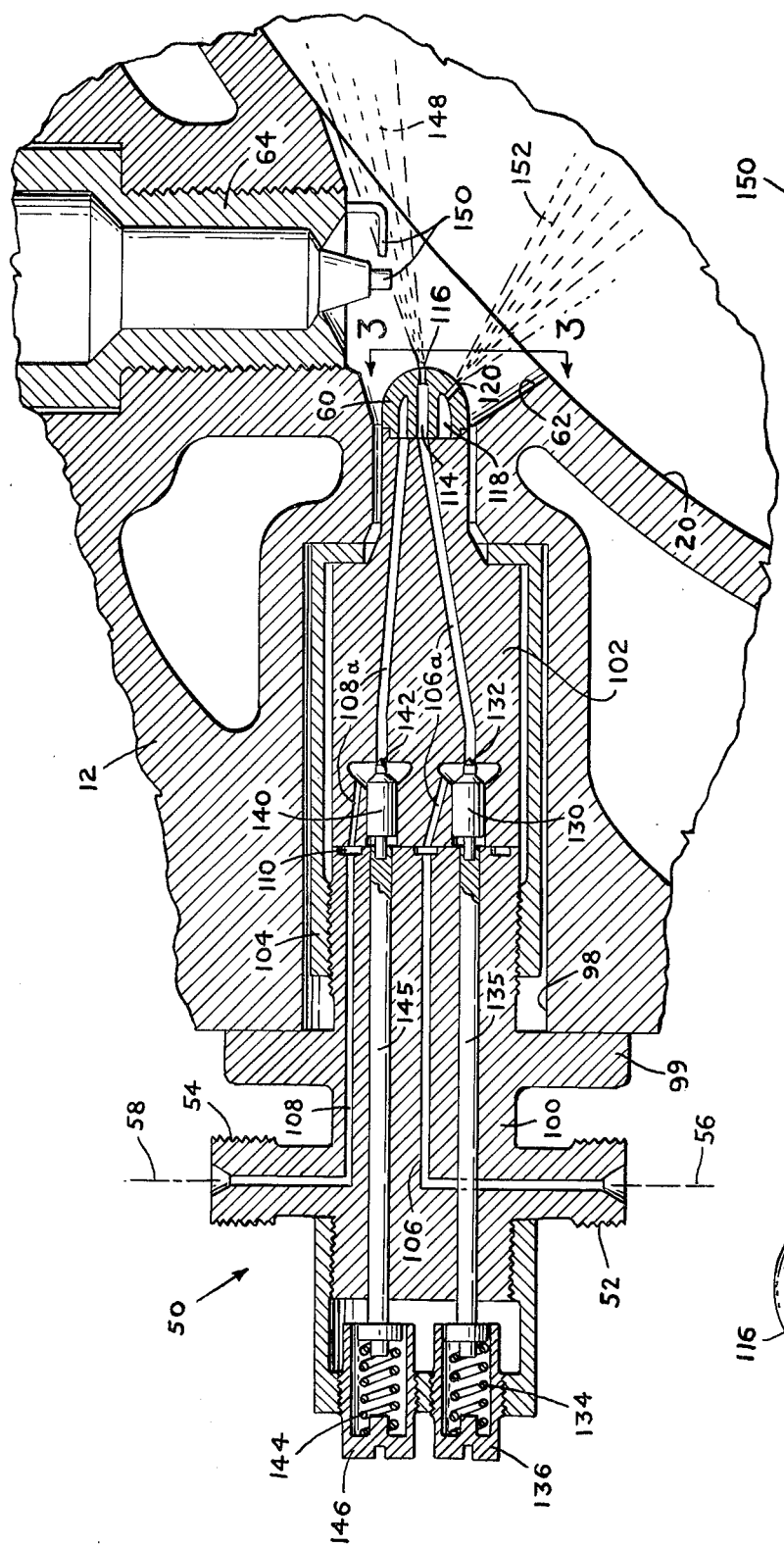
FIG. 2 is a substantially enlarged view of the fuel nozzle and ignition structure of FIG. 1.
Figure 3:
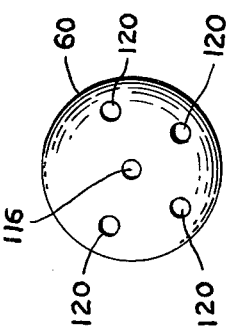
FIG. 3 is a view taken along line 3—3 of FIG. 2.

Reference is now made to FIGS. 2 and 3 of the drawing for details of the dual fuel nozzle structure 50 and its relation with the spark plug 64. This fuel nozzle structure is disposed within a recess 98 in the engine housing 12 and is secured in position within this recess by suitable attaching means such as a mounting flange 99. As illustrated, the nozzle structure 50 consists of a body member 100 and a nozzle member 102 secured together by a threaded element 104. The nozzle body member includes a fuel passageway 106 which runs from the inlet connection 52 to the center of the body member at its junction with the nozzle member 102. The nozzle body member also includes a second fuel passageway 108 running from the fuel inlet connection 54 to an annulus 110 at the junction with the nozzle member 102. For convenience of illustration, the inlet connection 52 has been shown in the plane of FIGS. 1 and 2. Preferably, however, this inlet connection should be rotated 90° about the axis of the nozzle from the position illustrated.

The nozzle member 102 includes two passageways 106a and 108a communicating with the passageways 106 and 108 respectively at the junction of the nozzle member 102 with the body member 100. The annulus 100 provides for this communication between the passageways 108 and 108a regardless of the relative rotative positions of the body member 100 and nozzle member 102.

The nozzle member 102 includes a tip portion 60 having a central passageway 114 communicating with the nozzle member passageway 106a and terminating in a discharge orifice 116. In addition, the nozzle tip portion 60 has an annulus 118 disposed about its central passageway 114 and communicating with the nozzle member passageway 108a. The nozzle tip portion is provided with one or more discharge orifices 120 disposed about the central orifice 116 as seen in FIG. 3. The nozzle tip portion 60 is secured to the nozzle member 102 preferably by welding or brazing.

The fuel passageway 106a includes a movable valve element 130 subjected to the fuel pressure upstream of said valve for moving the valve away from a valve seat 132 against a spring 134. For this purpose the valve 130 has a push connection with a rod 135 against which the spring 134 acts. When the pressure of the fuel supplied by the pump 70 to the nozzle fuel passageway 106 reaches a predetermined magnitude, the valve 130 lifts off its seat against the spring 134 whereupon fuel discharges through the nozzle orifice 116 into the working chambers 28. The magnitude of the pressure on which the valve 130 opens can be set by adjustment of the nut 136 to vary the compression of the spring 134.

Similarly the fuel passageway 108a includes a valve 140 subjected to the pressure of the fuel upstream of the valve 140 for moving this valve away from a valve seat 142 against a spring 144 acting against the valve rod 145. Thus, when the pressure of the fuel supplied by the pump 72 to the nozzle fuel passageway 108 reaches a predetermined magnitude the valve 140 lifts off its seat against a spring 144 whereupon fuel also discharges through the nozzle orifices 120 into each working chamber 28. The force of the spring 144 and therefore the fuel pressure at which the valve 140 opens, can be varied by adjustment of the nut 146. The fuel pressures at which the valves 130 and 140 open are therefore independently adjustable. The rear end of the nozzle structure 50, that is, the portion containing the springs 134 and 144 and the adjacent ends of the associated rods 135 and 145, preferably is vented by a passage (not shown) back to the fuel tank.

The nozzle orifice 116 for the fuel passageway 106a is orientated to direct this fuel spray discharge 148 into close proximity to the electrodes 150 of the spark plug 64 in order that the fuel vapor produced by this discharge can readily be ignited by the spark plug. The fuel passageway 108a preferably terminates in a plurality of nozzle orifices 120 (see FIG. 3) so that the fuel discharges through these orifices 120 in a plurality of individual fuel discharge sprays 152 to produce a showerhead-type of fuel spray pattern.

As viewed in FIG. 1, the working chamber 28 appearing in the upper portion of this figure has reached a position just short of its top dead center position. The pump 70 is designed so that when the working chamber 28 reaches this position, fuel is supplied by the pump 70 through the passageways 56, 106, 106a and nozzle orifice 116 for discharge into said working chamber. In addition, the ignition circuit 94 is designed so that the spark plug 52 is energized during this fuel discharge to ignite the fuel spray discharge 150 from the nozzle orifice 116. The pump 72 is designed to supply fuel through the passageways 58, 108, 108a for discharge from the nozzle orifices 120 at about the same time that the pump 70 supplies fuel for discharge from the nozzle orifice 116. Accordingly, the burning of the fuel spray 150 discharging from the orifice 116 functions as a pilot flame for the fuel discharging from the orifices 120.

The quantity of fuel supplied by the pump 70 discharged from the orifice 116 into each working chamber 28 preferably is adjusted by the rack 70 to provide optimum conditions for ready ignition by the spark plug 64 of this fuel spray discharge 148 from the nozzle orifice 116 so as to provide an effective pilot flame to ignite the fuel spray discharges 152 from the nozzle orifices 120. The quantity of fuel supplied by the pump 72 into each working chamber preferably is adjusted by the rack 86 to vary the fuel flow to control the engine power output. As already described, this latter fuel discharges from the nozzle orifices 120 and is ignited by the pilot flame provided by the fuel discharge 148 supplied by the pump 70. In this way the orifice 116 and its associated fuel passageways can be sized for low fuel flows to provide for optimum ignition characteristics throughout the engine operating range. In fact, the nozzle orifice could supply the entire fuel flow during low power engine operation, for example, during idling. At the same time the orifices 120 and associated fuel passageways are sized to accommodate the larger fuel flows for higher power engine operation with these orifices 120 providing good fuel distribution throughout this higher range of engine power.

The fuel system of the present invention is accomplished with only a single nozzle structure 50. Accordingly, with the present invention the leakage across the apex seals as they pass the fuel nozzle structure is substantially reduced as compared to the dual nozzle system of the aforementioned co-pending application, Ser. No. 424,056 in which two individual fuel nozzle structures are provided. At the same time the problem of adequately cooling the engine housing 12 in the combustion zone, that is, in the vicinity of the upper portion of the housing as viewed in FIG. 1, is minimized.

Figure 4:
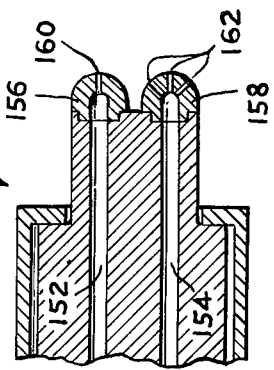
FIG. 4 is a view of a modified form of the invention.

FIG. 4 illustrates a modified form of the invention in which instead of a single nozzle tip element 60, the nozzle structure is provided with two tip elements, one for each of the fuel passageways. Thus, in FIG. 4 the nozzle structure 150 with its two nozzle fuel passageways 152 and 154 corresponds to the nozzle structure 50 and its fuel passageways 107 and 109 of FIG. 2. In FIG. 4, however, each fuel passageway 152 and 154 terminates in its own nozzle tip element 156 and 158 respectively instead of as in FIG. 2 terminating in the common tip element 60. The tip element 156 has a single orifice 160 corresponding to the orifice 116 of FIGS. 2 and 3 and the nozzle tip element 158 has a plurality of nozzle orifices 162 corresponding to the orifices 120 of FIGS. 2 and 3. The modification of FIG. 4 is otherwise like the embodiment of FIGS. 1 to 3 and therefore no further description of FIG. 4 is necessary.

The invention has been described in connection with a rotary engine having a dual fuel injection and ignition system generally similar to that disclosed in the aforementioned co-pending application, Ser. No. 424,056. It is obvious, however, that the invention is also applicable to other dual fuel injection systems for rotary engines. It should be understood, therefore, that the invention is not limited to the specific details of construction and arrangement herein described and that changes and modifications may be made therein without departing from the spirit and scope of the invention.

What is claimed is:

1. A rotary combustion engine comprising:
   a. an outer body having an internal cavity, the peripheral surface of which has a multi-lobe profile, said outer body also having an air intake passage characterized by the absence of any air throttle valve and a combustion gas exhaust passage,
   b. an inner body of generally polygonal profile mounted for relative rotation within said outer body, the apex portions of said inner body having sealing cooperation with said peripheral surface to define a plurality of working chambers which vary in volume in response to said relative rotation,
   c. a dual fuel nozzle for supplying fuel to the engine working chambers, said dual fuel nozzle including a nozzle body mounted in the engine outer body and having nozzle tip means for discharging fuel into the engine working chambers through a recess in the inner surface of said outer body after the air intake charge therein has been substantially compressed, said nozzle body also having a first passageway for supplying fuel to said nozzle tip means for fuel discharge through said recess into the engine working chambers from a single orifice in said nozzle tip means and having a second passageway for supplying fuel to said nozzle tip means for fuel discharge through said same recess into the engine working chambers from a plurality of orifices in said nozzle tip means,
   d. a pair of fuel pumps, one pump being for supplying fuel to said first nozzle passageway and its first opening means and the other pump being for supplying fuel to said second nozzle passageway and its second opening means,
   e. a single spark plug carried by the outer body adjacent to the dual fuel nozzle with the electrode end of the spark plug being in communication with the engine working chambers through the same recess in the outer body inner surface through which the dual fuel nozzle discharges with at least a portion of the fuel discharged from the single orifice of the first passageway passing in close proximity to the electrode end of the spark plug for igniting the fuel as it discharges from said single orifice, the ignited fuel discharged from said single orifice functioning as a pilot burner for igniting the fuel discharged from the plurality of orifices of said second passageway, and
   f. means for regulating the pump supplying fuel to said second passageway for varying the quantity of fuel discharged from its plurality of orifices into each working chamber so as to regulate the engine power output.

\* \* \* \* \*